United States Patent [19]
Yang

[11] Patent Number: 5,239,173
[45] Date of Patent: Aug. 24, 1993

[54] BINARY DATA PROCESSOR USING DIFFRACTION AND INTERFERENCE OF WAVES

[76] Inventor: Tai-Her Yang, 5-1 Taipin St., Si-Hu Town, Dzan-Hwa, Taiwan

[21] Appl. No.: 895,931

[22] Filed: Jun. 9, 1992

Related U.S. Application Data

[63] Continuation-in-part of Ser. No. 580,637, Sep. 11, 1990, Pat. No. 5,160,838, which is a continuation-in-part of Ser. No. 372,629, Jun. 28, 1989, abandoned, which is a continuation-in-part of Ser. No. 69,153, Jul. 2, 1987, abandoned.

[51] Int. Cl.⁵ .............................................. H01J 40/14
[52] U.S. Cl. ................................. 250/214 S; 377/102
[58] Field of Search .......................... 250/551, 214 LS; 377/102; 365/109, 110, 111; 359/558, 565, 566, 561

[56] References Cited

U.S. PATENT DOCUMENTS 3,358,146 12/1967 Ing et al. ........................ 250/214 LS
3,680,080 7/1972 Maure ........................... 250/214 LS

*Primary Examiner*—David C. Nelms
*Attorney, Agent, or Firm*—Leonard Bloom

[57] ABSTRACT

An optical binary data processor which utilizes a plurality of light beams (or other waves, such as sound waves) which diffract at two or more apertures and which interfere such that the resulting pattern of illumination may be read to yield a particular logic operation. The optical data processor is capable of performing conventional binary logic operations on anywhere from two to N optical inputs, and multiple processors may be cascaded to perform any level of combinational logic.

35 Claims, 5 Drawing Sheets

BINARY DATA PROCESSOR USING DIFFRACTION AND INTERFERENCE OF WAVES

CROSS-REFERENCE TO RELATED APPLICATIONS

The present invention constitutes a continuation-in-part of U.S. patent application Ser. No. 580,637 filed on Sep. 11, 1990, now U.S. Pat. No. 5,160,838, which in turn is a continuation-in-part of U.S. patent application Ser. No. 372,629 filed on Jun. 28, 1989, abandoned, which in turn is a continuation-in-part of U.S. patent application Ser. No. 069,153 filed on Jul. 2, 1987, abandoned, the disclosures of which are incorporated herein by their entireties, respectively.

FIELD OF THE INVENTION

The present invention relates to optical processing of binary data and, more particularly, to performing a plurality of logic operations by a plurality of light beams which singly diffract at two or more apertures and which interfere, such that the resulting pattern of illumination contains the output information of the optical processor.

BACKGROUND OF THE INVENTION

The use of electromagnetic and sound waves to communicate information is well known in the prior art. The apparatus and method may involve amplitude modulation, frequency modulation, polarization modification or wave train interruption for a single wave train.

For a slit or aperture not too much larger than the wavelength of the wave train, diffraction will occur as the wave passes through the slit. The wave spreads laterally outside the geometric collimation limits. The intensity of the wave passes through maxima and nulls as the angle from beam axis direction increases, the magnitude of the maxima rapidly decreasing as the angle increases.

While diffraction is always present in the propagation of a single wave train, it is not involved in the basic communication mechanism of amplitude modulation, frequency modulation, polarization modification or wave train interruption. Radiation of one frequency is used for amplitude modulation, polarization modification and wave train interruption while a bandwidth of frequencies is associated with frequency modulation.

Coherence within one beam of light is utilized in U.S. Pat. No. 3,776,616 issued to N. Douklias on Dec. 4, 1973, wherein a multi-channel correlator illuminates an object for the purpose of producing a hologram.

The prior art discloses devices in which a single wave train may be refracted or diffracted with respect to itself. However, the need remains for a binary logic apparatus and method for employing a plurality of coherent input beams to perform logic operations such as "AND," "OR" or "NOT." These binary logic operations of "AND," "OR," and "NOT" are the most basic operations, and they are used to construct the most sophisticated and complex digital circuits.

SUMMARY OF THE INVENTION

It is an object of the present invention to provide a binary data processor which utilizes a plurality of light beams (or other waves, such as sound waves) which diffract at two or more apertures and which interfere such that the resulting pattern of illumination is characteristic of a particular logic operation.

More particularly, the present invention is an apparatus and method for performing "AND," "OR," and "NOT" operations on two or more coherent input light signals which diffract and interfere to produce the logic outputs.

The invention comprises a sealed chamber having a pair of opposing walls. Two or more slits are disposed in a front wall, and the slits are spaced along the front wall such that coherent light falling on the slits produces an equal number of diffracting beams of light. A source of coherent light is provided externally of the sealed chamber, and light therefrom is transmitted to the slits by traveling along a path in a medium which may be air, vacuum or a bundle of fiber optic tubes. A mechanical or electro-optical shutter is provided at each slit so as to turn the light ON and OFF from the respective slit. When two or more slits are illuminated the diffracting beams interfere inside the sealed chamber. Conventional binary logic operations may be derived from the resulting pattern of illumination.

The optical processor according to the present invention may be used to perform logic operations on anywhere from two to N optical inputs, and the optical processor may be cascaded to perform any level of combinational logic.

These and other objects of the present invention will become apparent from a reading of the following specification, taken in conjunction with the enclosed drawings.

DESCRIPTION OF THE PREFERRED EMBODIMENTS

Figure 1:
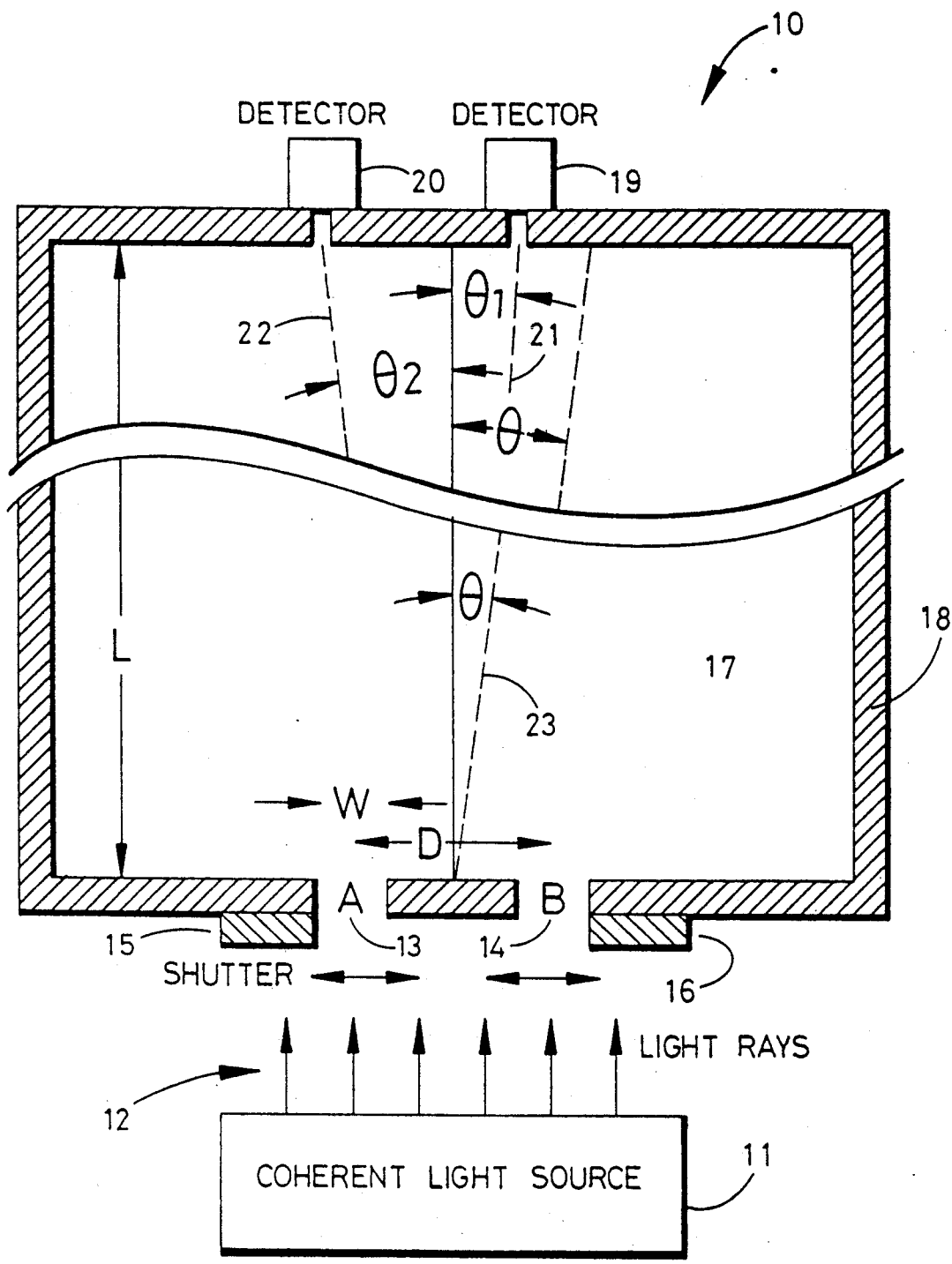
FIG. 1 is a schematic drawing of a two-slit apparatus for binary processing by diffraction and interference according to one embodiment of the present invention.

Referring to FIG. 1, there is illustrated (schematically) one embodiment of an optical processor 10, wherein a coherent light source 11 projects a beam of light which illuminates a pair of slits 13 and 14 in the wall 18 of a sealed chamber 17. When shutters 15 and 16 are open, two beams of light are admitted into the chamber, propagate the length L, and illuminate the wall opposite to the slits. Angle 23 ($\theta$) is the angle of derivation from the direction of propagation measured relative to an axis spaced midway between slits 13 and 14 and extending perpendicularly therebetween. Detectors 19 and 20 are positioned at angles 21 ($\theta_1$) and 22 ($\theta_2$), respectively.

The intensity of illumination on the wall opposite to the slits depends on the angle $\theta$. The intensity varies rapidly as the angle $\theta$ is increased from 0°. At angles $\theta_1$, the angles of destructive interference, the intensity is zero. Interference maxima occur at angles $\theta_2$ which fall between the minima at angles $\theta_1$. The largest maximum (principal) occurs at $\theta_2 = 0°$, and successive maxima fall off in intensity.

For a double slit system, the intensity at angle $\theta$ is given by $$I = I_m(\cos\beta)^2 \left(\frac{\sin\alpha}{\alpha}\right)^2$$

in which $$\beta = \left(\frac{\pi D}{\lambda}\right)\sin\theta$$

and $$\alpha = \left(\frac{\pi W}{\lambda}\right)\sin\theta$$

where
$I_m$ = maximum intensity of central bright line,
$\lambda$ = wavelength,
D = separation between slits, and
W = width of each slit.

The known intensity at angle $\theta$ derived from the controlled interference between two or more light beams can be used to generate the basic logic operations AND, OR and NOT.

Figure 2:
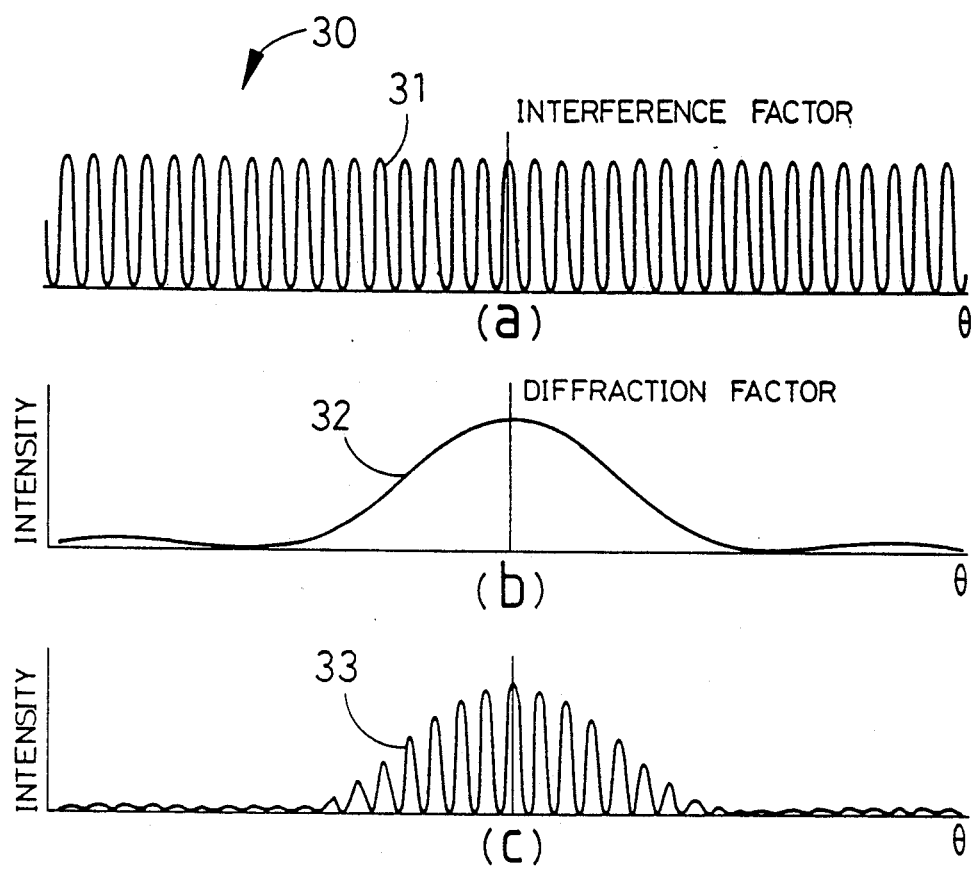
FIG. 2 illustrates the multiplication of the diffraction pattern by the interference factor to form the interference pattern for the two-slit system of FIG. 1.
Figure 3:
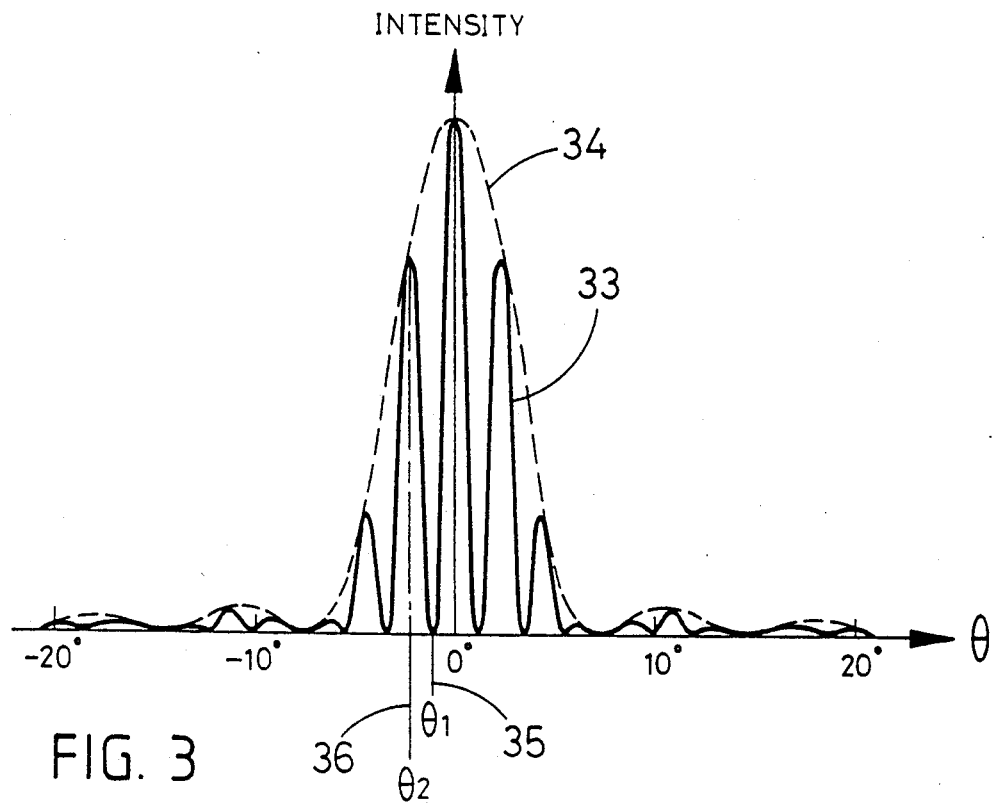
FIG. 3 shows the cancellation angle $\theta_1$, and the constructive interference angle $\theta_2$ for the two-slit system of FIG. 1.

FIGS. 2 and 3 show the extension of the interference pattern 33 over angle $\theta$.

When only one slit (13 or 14) is open in the embodiment of FIG. 1, the interference pattern is curve 32 in FIG. 2, which shows the intensity of light illuminating the wall opposite the slits as a function of angle 23 ($\theta$).

When both slits are open, light waves from the two slits interfere. The resultant interference pattern 33 is the product of the diffraction intensity curve 32 and the interference factor 31.

Referring to the enlarged interference pattern 33 of FIG. 3 (which is representative of the embodiment of FIG. 1 when both slits are open), the manner of deriving the logic operations AND, OR and NOT is described as follows.

The AND operation yields a binary "1" at a constructive interference angle $\theta_2$ simultaneously with a null at a cancellation angle $\theta_1$, and a binary "0" for all other combinations. Two detectors working cooperatively are required for the AND operation.

The OR operation yields a binary "1" for illumination at a constructive interference angle $\theta_2$ and binary "0" for no illumination at $\theta_2$. Only one detector is required for the OR operation.

The NOT operation is provided by interference of a signal beam with a reference beam and observation at a cancellation angle at which there is a cancellation (or logic "0") for signal beam ON (or logic "1") and illumination (or logic "1") for signal beam OFF (or logic "0"). Hence, the NOT operation requires a reference beam to interfere with a signal beam. For example, the NOT operation can be implemented in the embodiment of FIG. 1 by regarding the beam through open slit 14 as the reference beam. Detector 19 at $\theta_1$ will have an inverted or "NOT" output with respect to a signal beam through slit 13. Hence, when slit 13 is "ON" or "1," the yield at $\theta_1$ is null corresponding to logic "0," and visa versa.

Since the light source 11 communicates with the detectors 19 and 20 via waves which preferably travel at the speed of light, registration of the logic operation may take place over a large distance in the present invention.

It should be understood that, within the scope of the invention, the above-described logic operations may be implemented with any number of N input beams from any number N slits such as 13, 14 and N shutters such as 15, 16. The N slits are preferably evenly spaced along the 2-D plane of the chamber wall 18.

The interference pattern formed by N input beams differs from the two input embodiment of FIG. 1 only insofar as the intensity of the secondary maxima and the angle 23 ($\theta$) at which the secondary maxima occur. Hence, the resulting interference pattern from N input beams may be used in the same manner to characterize multi-input logic operations such as AND, OR and NOT.

Regardless of the number N of inputs from N slits 13, 14 and N shutters 15, 16, the result of the logic operation as embodied in the interference pattern may be discerned by one or two detectors 19, 20, depending on the particular type of logic operation. Any N-input logic operation may easily be discerned from the resulting interference pattern in substantially the same manner as the two-input embodiment of FIG. 1, taking account of differences in the intensity of the secondary maxima and the angle 23 ($\theta$) at which the secondary maxima occur.

Figure 4:
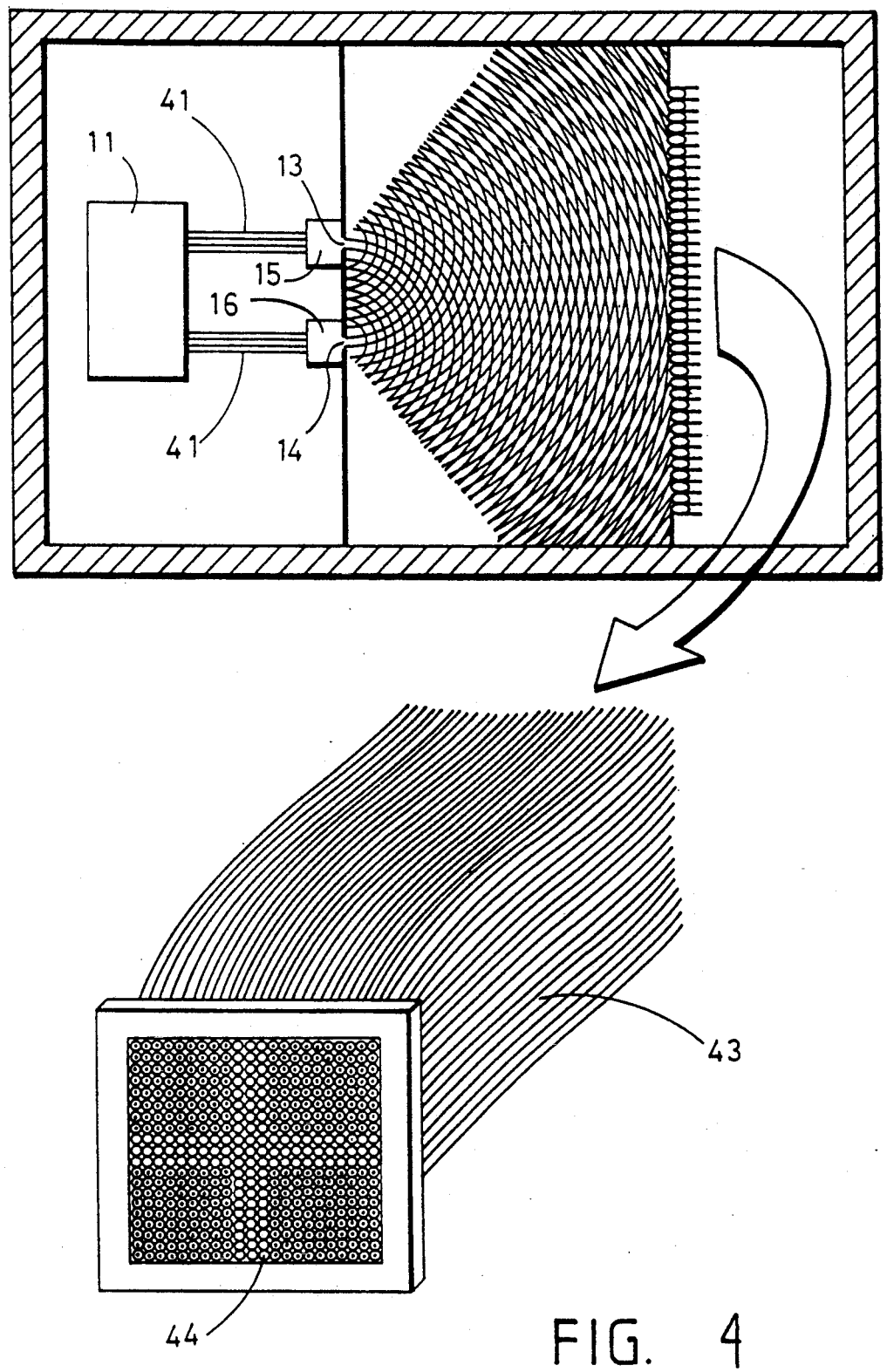
FIG. 4 is a schematic diagram of a second embodiment of the present invention which includes a two-slit optical processor with light pipes 41, and additionally, a fiber optic pattern display 44.

FIG. 4 shows a second embodiment in which the coherent light from source 11 is transmitted through solid light pipes 41 and electro-optical shutters 15 and 16 to slits 13 and 14, respectively. In addition, detectors 19 and 20 are replaced by an optic fiber bundle 43, the end faces 44 of which form the entire wall 18 opposite the slits 13 and 14. The light pattern incident on the wall 18 is conducted through the bundle of optic fibers 43 and is transmitted to the other end of the bundle There it can be digitally encoded or visually observed.

Figure 5:
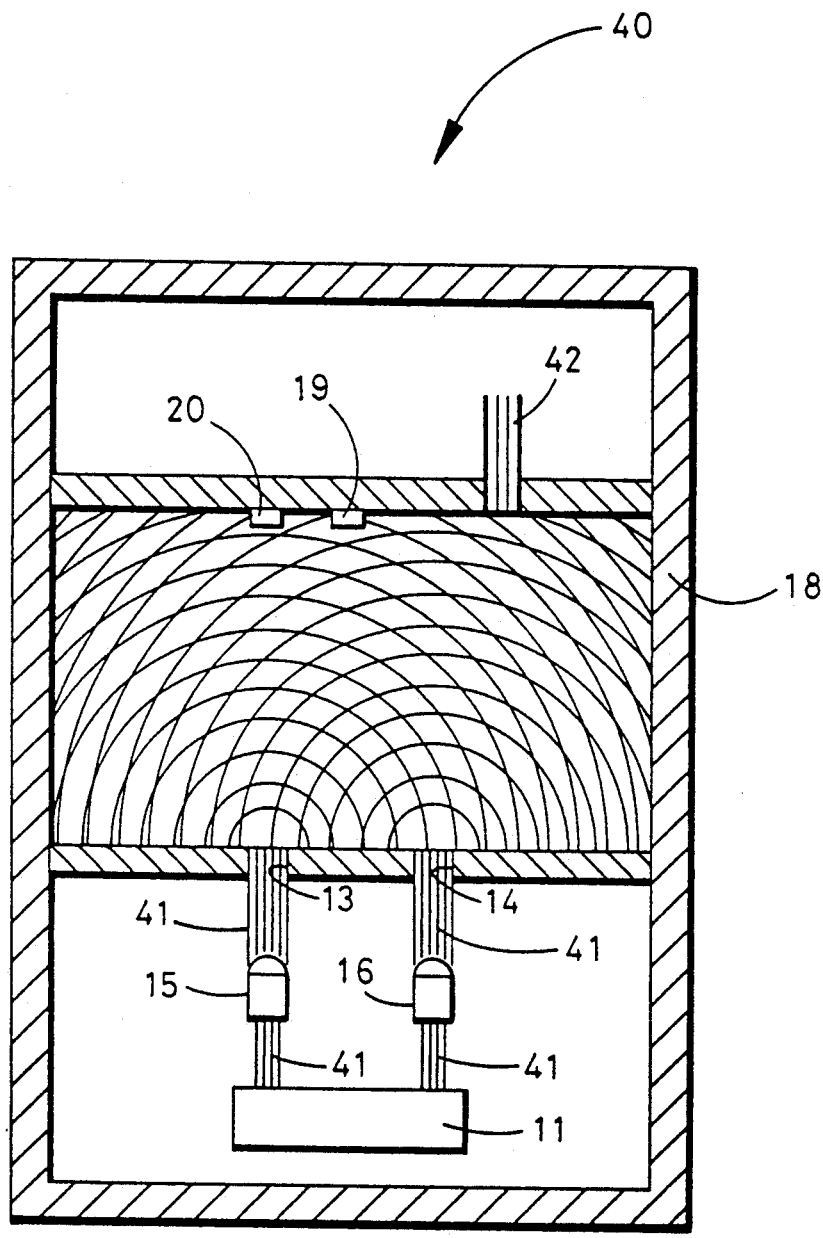
FIG. 5 is a schematic diagram of a third embodiment of the present invention including partitioned chamber walls 18. Light pipes 41 connect the coherent light source 11 to one partition to form a two-slit optical processor, and light pipe 42 connects another cascaded partition.

FIG. 5 shows a third embodiment of the present invention in which the coherent light from source 11 is transmitted through solid light pipes 41 and electro-optical shutters 15 and 16 to slits 13 and 14, respectively. In addition to the detectors 19 and 20, there may be one or more output light pipes 42 mounted on the wall opposite the slits. This way, chamber wall 18 may be sub-divided into cascaded partitions, and the succeeding partitions may be placed in optical communication with light source 11 via light pipe 42. Useful digital systems involve many logic steps, and the most sophisticated circuits can be constructed from combinations of AND, OR and NOT. To this end, the principle of FIG. 5 may be adapted to a multi-partitioned chamber 17 in which each partition corresponds to a selected logic step.

Figure 6:
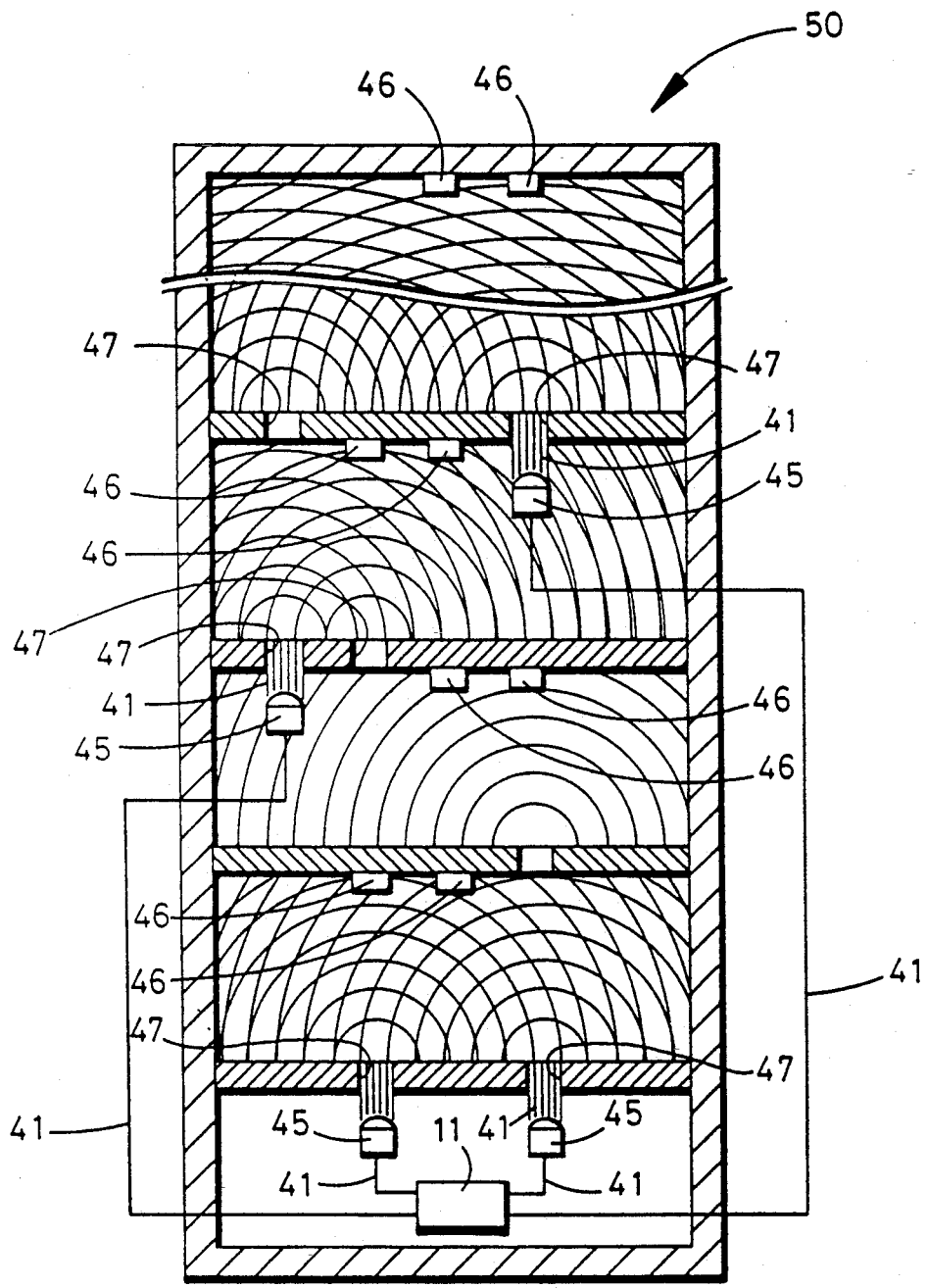
FIG. 6 is a schematic diagram of a fourth embodiment of the present invention in which the principle of FIG. 5 is extended to a multi-step cascaded optical processor.

For example, FIG. 6 shows a fourth embodiment which extends the principle of FIG. 5 to a cascaded series of N optical processing steps in which coherent light from source 11 is conducted through light pipes 41 to the respective shutters, each of which operates independently. Exaggerated displacements and source separations are shown for clarity and simplicity of explanation.

Obviously, many modifications may be made without departing from the basic spirit of the present invention. Accordingly, it will be appreciated by those skilled in the art, that within the scope of the appended claims, the invention may be practiced other than has been specifically described herein.

I claim:

1. An optical logic gate, comprising:
   a housing having a front surface and opposing back surface;
   a source of coherent light externally of the housing for illuminating said front surface;
   a plurality of diffraction slits formed in the front surface of said housing, said diffraction slits being arranged to admit a corresponding plurality of interfering beams light from said light source into said housing;
   a plurality of optical shutters each corresponding to one of said diffraction slits and each being selectively operable in one of a logic "0" and a logic "1" state to respectively obstruct/admit said corresponding beam of light from/into said housing;
   whereby when at least two of said optical shutters are operated in a logic "1" state the corresponding beams of light enter said housing and form an interference pattern comprising a series of alternating intensity maxima and minima incident along said back surface of said housing, and when all of said optical shutters are operated in a logic "0" state no light enters said housing, and when one of said optical shutters is operated in a logic "1" state while the other of said optical shutters are operated in a logic "0" state one of said beams of light enters said housing and falls incident without interference on said back surface of said housing; and
   at least one optical sensor mounted on the back surface of said housing and exposed to said plurality of diffraction slits for detecting light propagating therefrom, said optical sensor(s) outputting one of a logic "0" and a logic "1" in accordance with a threshold intensity of light.

2. The optical logic gate according to claim 1, wherein said at least one sensor further comprises a first sensor positioned at an intensity minima and a second sensor positioned at an intensity maxima of said interference pattern formed when at least two of said optical shutters are operated in a logic "1" state.

3. The optical logic gate according to claim 2, wherein a logical OR of the logic states of said optical shutter is indicated by said second sensor.

4. The optical logic gate according to claim 3, wherein a logic "1" state at one of said optical shutters is indicated by a logic "1" output from said second sensor.

5. The optical logic gate according to claim 2, wherein a logical AND of the logic states of said optical shutters is indicated by said pair of optical sensors.

6. The optical logic gate according to claim 5, wherein a logic "1" state at all of said optical shutters is indicated by a logic "1" output from said second sensor and a logic "0" output from said first sensor.

7. The optical logic gate according to claim 2, wherein a logical NOT is performed on the logic state of one of said optical shutters by selecting a logic "1" state at the other of said optical shutters.

8. The optical logic gate according to claim 7, wherein a logic "1" state at said one optical shutter is indicated by a logic "0" output from an optical sensor, and a logic "0" state at said one optical shutter is indicated by a logic "1" output from said optical sensor.

9. The optical logic gate of claim 1, wherein said at least one optical sensor further comprises a solid state photoelectric device.

10. The optical logic gate of claim 1, wherein said at least one optical sensor further comprises a phototube with a photo-cathode and amplifying dynodes.

11. The optical logic gate of claim 1, further comprising a bundle of fiber optic tubes connecting said coherent light source with one of said optical shutters.

12. The optical logic gate of claim 1, wherein said optical shutters each further comprise a mechanical shutter including a door, the door having a first closed position corresponding to a logic "0" state in which said light beam is obstructed from entering said housing, and the door having a second open position corresponding to a logic "1" state in which said light beam is admitted into said housing; and
   a means for disposing the door at one position or the other.

13. The optical logic gate of claim 1, wherein each one of said optical shutters further comprises an electrooptic medium having a first opaque state corresponding to a logic "0" state in which said light beam is obstructed from entering said housing, and a second transparent state corresponding to a logic "1" state in which said light beam is admitted into said housing, and
   electrical control means for electrically switching between said first state and said second state of said electrooptic medium.

14. The optical logic gate of claim 1, wherein each one of said optical shutters further comprises an magnetooptic medium having a first opaque state corresponding to a logic "0" state in which said light beam is obstructed from entering said housing, and a second transparent state corresponding to a logic "1" state in which said light beam is admitted into said housing, and
   magnetic control means for magnetically switching between said first state and said second state of said electrooptic medium.

15. The optical logic gate of claim 1, wherein the enclosure contains an optical medium other than vacuum or atmospheric air, said media being a gas other than air, a liquid or a solid.

16. The optical logic gate of claim 1, wherein the light source is a laser.

17. An optical logic gate, comprising:
   a housing having a front surface and opposing back surface;
   a source of coherent light externally of the housing for illuminating said front surface;
   a pair of parallel diffraction slits formed in the front surface of said housing, said pair of diffraction slits including a first slit and a second slit parallely spaced to admit two interfering beams light from said light source into said housing;
   a pair of optical shutters corresponding to said pair of diffraction slits, said optical shutters each being selectively operable in one of a logic "0" and a logic "1" state to respectively obstruct/admit one of said beams of light from/into said housing;

whereby when both of said optical shutters are operated in a logic "1" state said two beams of light both enter said housing and form an interference pattern comprising a series of alternating intensity maxima and minima incident along said back surface of said housing, and when both of said optical shutters are operated in a logic "0" state no light enters said housing, and when one of said optical shutters is operated in a logic "1" state while another of said optical shutters is operated in a logic "0" state one of said beams of light enters said housing and falls incident without interference on said back surface of said housing; and a pair of optical sensors mounted on the back surface of said housing and exposed to said pair of diffraction slits, each of said optical sensors detecting light propagating from said diffraction slits and outputting one of a logic "0" and a logic "1" in accordance with a threshold intensity of light, said pair of sensors further including a first sensor positioned at an intensity minima and a second sensor positioned at an intensity maxima of said interference pattern formed when both of said optical shutters are operated in a logic "1" state.

18. The optical logic gate according to claim 17, wherein a logical OR of the logic states of said pair of optical shutters is indicated by said second sensor.

19. The optical logic gate according to claim 18, wherein a logic "1" state at one of said optical shutters is indicated by a logic "1" output from said second sensor.

20. The optical logic gate according to claim 17, wherein a logical AND of the logic states of said pair of optical shutters is indicated by pair of optical sensors.

21. The optical logic gate according to claim 20, wherein a logic "1" state at both of said optical shutters is indicated by a logic "1" output from said second sensor and a logic "0" output from said first sensor.

22. The optical logic gate according to claim 17, wherein a logical NOT is performed on the logic state of one of said optical shutters by selecting a logic "1" state at the other of said optical shutters.

23. The optical logic gate according to claim 22, wherein a logical NOT is performed on the logic state of one of said optical shutters by selecting a reference logic "1" state at the other of said optical shutters.

24. The optical logic gate according to claim 23, wherein a logic "1" state at said one optical shutter is indicated by a logic "0" output from an optical sensor, and a logic "0" state at said one optical shutter is indicated by a logic "1" output from said optical sensor.

25. An optical logic gate, comprising:
a bundle of optical fibers each having a first end and a second end, the collective first ends of said optical fibers being aligned to form a first surface;
a chamber bounded by said first surface and an opposing second surface;
a source of coherent light externally of the chamber for illuminating said second surface;
a pair of parallel diffraction slits formed in the second surface of said housing, said pair of diffraction slits including a first slit and a second slit parallely spaced to admit two interfering beams light from said light source into said housing;
a pair of optical shutters corresponding to said pair of diffraction slits, said optical shutters each being selectively operable in one of a logic "0" and a logic "1" state to respectively obstruct/admit one of said beams of light from/into said housing;
whereby when both of said optical shutters are operated in a logic "1" state, said two beams of light both enter said housing and form an interference pattern comprising a series of alternating intensity maxima and minima incident along said first surface of said housing, and when both of said optical shutters are operated in a logic "0" state no light enters said housing, and when one of said optical shutters is operated in a logic "1" state while another of said optical shutters is operated in a logic "0" state one of said beams of light enters said housing and falls incident without interference on said first surface of said housing;
whereby a two dimensional image of light incident on said first surface appear at the second ends of said optical fibers and the logic states of said pair of optical shutters can be visually determined from said interference pattern.

26. An optical combinational-logic gate, comprising:
a housing having a front surface and opposing back surface, said housing being partitioned into multiple chambers, and each succeeding chamber being in optical communication with a preceding chamber;
a source of coherent light externally of the housing for illuminating said front surface;
a plurality of diffraction slits formed in the front surface of said housing, said diffraction slits being arranged to admit a corresponding plurality of interfering beams light from said light source into a first chamber of said housing;
a plurality of optical shutters each corresponding to one of said diffraction slits and each being selectively operable in one of a logic "0" and a logic "1" state to respectively obstruct/admit said corresponding beam of light from/into said first chamber of said housing;
whereby when at least two of said optical shutters are operated in a logic "1" state the corresponding beams of light enter said first chamber of said housing and form an interference pattern comprising a series of alternating intensity maxima and minima incident along a back surface of said first chamber, and when all of said optical shutters are operated in a logic "0" state no light enters said first chamber, and when one of said optical shutters is operated in a logic "1" state while the other of said optical shutters is operated in a logic "0" state one of said beams of light enters said chamber and falls incident without interference on the back surface of said housing; and
at least one optical sensor mounted on the back surface of each of said plurality of chambers for detecting light propagating therein, said optical sensors outputting one of a logic "0" and a logic "1" in accordance with a threshold intensity of light.

27. An sonic logic gate, comprising:
a housing having a front surface and opposing back surface;
a source of sound waves external to the housing;
a plurality of diffraction slits formed in the front surface of said housing, said diffraction slits including a first slit and a second slit parallely spaced to admit interfering wavetrains of sound from said sound source into said housing;

a plurality of sonic shutters each corresponding to one of said diffraction slits, said sonic shutters each being selectively operable in one of a logic "0" and a logic "1" state to respectively obstruct/admit one of said wavetrains of sound from/into said housing;

whereby when all of said sonic shutters are operated in a logic "1" state said corresponding wavetrains of sound enter said housing and form an interference pattern comprising a series of alternating amplitude maxima and minima incident along said back surface of said housing, when all of said sonic shutters are operated in a logic "0" state no sound enters said housing, and when one of said sonic shutters is operated in a logic "1" state while the other of said sonic shutters are operated in a logic "0" state one of said wavetrains of sound enters said housing and falls incident without interference on said back surface of said housing; and a pair of sound sensors mounted on the back surface of said housing and exposed to said diffraction slits, each of said sound sensors detecting sound propagating from said diffraction slits and outputting one of a logic "0" and a logic "1" in accordance with a threshold amplitude of sound.

28. The sonic logic gate according to claim 27, wherein said pair of sound sensors further includes a first sensor positioned at an amplitude minima and a second sensor positioned at an amplitude maxima of said interference pattern formed when both of said sound shutters are operated in a logic "1" state.

29. The sonic logic gate according to claim 28, wherein a logical OR of the logic states of said pair of sonic shutters is indicated by said second sensor.

30. The sonic logic gate according to claim 28, wherein a logic "1" state at one of said sonic shutters is indicated by a logic "1" output from said second sensor.

31. The optical logic gate according to claim 28, wherein a logical AND of the logic states of said pair of sonic shutters is indicated by said pair of sound sensors.

32. The sonic logic gate according to claim 28, wherein a logic "1" state at both of said sonic shutters is indicated by a logic "1" output from said second sensor and a logic "0" output from said first sensor.

33. The sonic logic gate according to claim 28, wherein a logical NOT is performed on the logic state of one of said sonic shutters by selecting a logic "1" state at the other of said sonic shutters.

34. The optical logic gate according to claim 28, wherein a logical NOT is performed on the logic state of one of said sonic shutters by selecting a reference logic "1" state at the other of said sonic shutters.

35. The optical logic gate according to claim 28, wherein a logic "1" state at said one sonic shutter is indicated by a logic "0" output from a sound sensor, and a logic "0" state at said one sonic shutter is indicated by a logic "1" output from said sound sensor.

* * * * *